(12) United States Patent
McHale et al.

(10) Patent No.: US 7,447,946 B2
(45) Date of Patent: Nov. 4, 2008

(54) STORAGE OF TRACE DATA WITHIN A DATA PROCESSING APPARATUS

(75) Inventors: David F McHale, Harrow (GB); Rahoul K Varma, Maidenhead (GB); Marc R Wicks, Epsom (GB); Mike Livesley, Bracknell (GB); Gareth Duncan, Maidenhead (GB)

(73) Assignee: ARM Limited, Cambridge (GB)

( * ) Notice: Subject to any disclaimer, the term of this patent is extended or adjusted under 35 U.S.C. 154(b) by 733 days.

(21) Appl. No.: 10/981,741

(22) Filed: Nov. 5, 2004

(65) Prior Publication Data

US 2006/0112310 A1    May 25, 2006

(51) Int. Cl.
*G06F 11/00* (2006.01)

(52) U.S. Cl. .............................. 714/45; 714/27; 714/30; 714/34; 714/37; 714/39

(58) Field of Classification Search .................. 714/27, 714/30, 34, 36, 37, 39, 45
See application file for complete search history.

(56) References Cited

U.S. PATENT DOCUMENTS

| | | | | |
|---|---|---|---|---|
| 5,491,793 A | * | 2/1996 | Somasundaram et al. ..... | 714/45 |
| 5,964,893 A | * | 10/1999 | Circello et al. ................ | 714/39 |
| 6,115,763 A | * | 9/2000 | Douskey et al. ............... | 714/30 |
| 6,530,047 B1 | * | 3/2003 | Edwards et al. ............... | 714/31 |
| 6,732,307 B1 | * | 5/2004 | Edwards ....................... | 714/45 |
| 6,760,867 B2 | * | 7/2004 | Floyd et al. ................... | 714/39 |
| 2003/0126508 A1 | * | 7/2003 | Litt .............................. | 714/39 |

* cited by examiner

*Primary Examiner*—Bryce P. Bonzo
*Assistant Examiner*—Joseph D Manoskey
(74) *Attorney, Agent, or Firm*—Nixon & Vanderhye P.C.

(57) ABSTRACT

The present invention provides a data processing apparatus and method for storing trace data. The data processing apparatus comprises a bus operable to interconnect a number of master devices and slave devices to enable transactions to be routed between the master and slave devices. Each master device is able to initiate a transaction, with the transaction specifying a transaction address. A cache is interposed between at least one of the master devices and the bus and is operable to receive the transaction issued by that master device. The cache has a cache memory and a cache controller operable to control access to the cache memory. The cache controller comprises caching logic operable to selectively cache a data value of the transaction at a location in the cache memory chosen dependent on the transaction address. Control storage is provided identifying a trace address range specifying a trace region. Further, trace logic is provided which is operable to selectively generate as trace data one or more attributes associated with the transaction and to provide in association with that trace data a trace address selected from the trace address range. The caching logic is then operable to store the trace data at a location in the cache memory chosen dependent on the trace address. In this way, the cache can be used in a flexible manner to not only act as a normal cache but also to selectively store within the cache trace data.

37 Claims, 5 Drawing Sheets

STORAGE OF TRACE DATA WITHIN A DATA PROCESSING APPARATUS

FIELD OF THE INVENTION

The present invention relates to a data processing apparatus and method for storing trace data.

BACKGROUND

Tracing the activity of a data processing system whereby a stream of trace data is generated including data representing the step-by-step activity within the system is a highly useful tool in system development. As well as off-chip tracing mechanisms for capturing and analyzing trace data, increased amounts of tracing functionality are being placed on-chip. An example of such on-chip tracing mechanisms is the Embedded Trace Macrocell (ETM) provided by ARM Limited, Cambridge, England in association with various of their ARM processors.

Such tracing mechanisms produce in real time a stream of trace elements representing activities of the data processing system that are desired to be traced. This trace stream can then subsequently be used to facilitate debugging of sequences of processing instructions being executed by the data processing system.

Within a System-on-Chip (SoC) there will typically be a number of master devices interconnected with a number of slave devices via one or more buses. Transactions are typically initiated by the master devices and are actioned by appropriate slave devices. These transactions are routed over the interconnecting bus network. Whilst the ETM allows a great deal of trace data to be generated concerning the activities of the associated processor core (a processor core being an example of a master device), the ETM is unable to trace information about the actual transactions being routed from that processor core, or indeed from other master devices, onto the bus.

As SoC designs increase in complexity, so the complexity of the interconnecting bus network increases. It is known to develop monitor logic to monitor a bus, but as bus designs increase in complexity, the complexity and size of the associated monitor logic increases. Nevertheless, the ability to monitor the activities of the bus in order to produce trace data relating to those activities that can then subsequently be used (possibly in combination with any trace data produced by an ETM) to debug sequences of processing instructions is highly desirable.

Accordingly, it would be desirable to provide functionality that allowed tracing of attributes associated with transactions initiated from the master device to the bus without significantly increasing the cost and complexity of the system design.

SUMMARY

Viewed from a first aspect, the present invention provides a data processing apparatus comprising: a bus operable to interconnect a number of master devices and slave devices to enable transactions to be routed between the master and slave devices; a master device operable to initiate a transaction, the transaction specifying a transaction address; a cache interposed between the master device and the bus and operable to receive the transaction, the cache having a cache memory and a cache controller operable to control access to the cache memory, the cache controller comprising caching logic operable to selectively cache a data value of the transaction at a location in the cache memory chosen dependent on the transaction address; control storage operable to identify a trace address range specifying a trace region; and trace logic operable to selectively generate as trace data one or more attributes associated with the transaction and to provide in association with that trace data a trace address selected from the trace address range; the caching logic being operable to store the trace data at a location in the cache memory chosen dependent on the trace address.

In a typical data processing apparatus, it is often the case that a cache is interposed between the master device and a bus interconnecting the master device with the other master and slave devices of the apparatus. The inventors of the present invention realised that much of the information that bus monitor logic would wish to receive relating to transactions issued by the master device would pass through such a cache. Further, the inventors of the present invention realised that it would be possible to modify the cache design such that it could locally generate the required trace data and store it within the cache memory of the cache, thus in effect replicating the desired behaviour of bus monitor logic without the need for a separate piece of logic.

In particular, in accordance with the present invention, the cache has a cache memory and a cache controller operable to control access to the cache memory, with the cache controller comprising caching logic operable to selectively cache (for example dependent on whether the transaction is cacheable) a data value of the transaction at a location in the cache memory chosen dependent on the address specified by the transaction. As will be appreciated by those skilled in the art, a cache may be arranged to store data and/or instructions fetched from a memory so that they are subsequently readily accessible by a processor. Herein, the term "data value" will be used to refer to both instructions and data.

However, to support behaviour in addition to this normal cache behaviour, the data processing apparatus further comprises control storage operable to identify a trace address range specifying a trace region. Typically, this trace address range will be defined by a master device coupled to the cache. Further, trace logic is provided which is operable to selectively generate (for example dependent on whether tracing is enabled, any specified conditions for tracing are met, etc) as trace data one or more attributes associated with the transaction and to provide in association with that trace data a trace address selected from the trace address range. This trace data and associated trace address is then routed to the caching logic, to cause the caching logic to then store the trace data at a location in the cache memory chosen dependent on the trace address. It will be appreciated that the control storage and the trace logic can be provided at any appropriate location within the data processing apparatus. However, in one embodiment the trace logic and control storage are provided within the cache controller.

Hence, it can be seen that in accordance with the present invention trace data is generated (in one embodiment this being generated internally within the cache) and then the cache memory is used to store that trace data. This provides a very efficient technique for implementing the desired behaviour of a bus monitor within the cache. In particular, it can be seen that this reduces the size and complexity of the data processing apparatus by avoiding the requirement for a separate bus monitor, with instead the existing cache resources being used to trace the required information. In addition, it will be appreciated that the amount of the cache used for storing trace data can be varied, thus providing further flexibility. In addition, when debugging has been completed, the cache can be used entirely for normal data caching purposes, whereas in a typical prior art approach where a separate bus monitor is provided, there would at this point be some redundant buffer memory that would no longer be needed. Accordingly, it is clear that the approach of the present invention can reduce the complexity of the design of the data processing apparatus, and hence reduce the cost and size, and also can provide improved flexibility.

The trace information obtained using the present invention may be used for debug purposes, or for analysis to access performance issues.

There are a number of ways in which the cache memory could be arranged such that the caching logic is able to store the trace data within the cache memory. In one embodiment, the cache memory comprises a plurality of cache ways including at least one reserved cache way reserved for trace data, and the caching logic is operable to store the trace data within one of the at least one reserved cache ways. This approach provides a clear demarcation between the parts of the cache used for standard data value caching, and the parts of the cache used to store trace data.

However, in an alternative embodiment, the caching logic is not restricted to store the trace data within one or more reserved cache ways, but instead can store the trace data at any available location within the cache memory. In such embodiments, the cache controller is operable to maintain a record of which locations in the cache memory contain trace data and the order in which the trace data was received by the cache. In one particular embodiment, the cache memory comprises a plurality of cache lines, each cache line having one or more control fields associated therewith, one control field being a trace field, the cache controller being operable to set the trace field if the associated cache line contains trace data. Hence, in accordance with this embodiment, individual cache lines can be allocated for storing trace data with a control field being associated with each cache line to indicate whether that cache line has been allocated for storage of trace data. This hence enables the trace data to be clearly distinguished from the data values being cached within the cache memory as part of the standard cache operation. In one embodiment information identifying the order in which the trace data is received is stored with the trace data in the cache memory.

There are a number of ways in which the trace data stored within the cache can be retrieved for analysis, for example during debug operations, or when seeking to analyse performance issues that the trace data may help identify. In one embodiment, the cache has a trace bus connected thereto, the trace data being retrievable from the cache memory via the trace bus. Accordingly, in such embodiments, a dedicated trace bus exists which is coupled to the cache, and hence analysis tools can be used to retrieve the trace data from the cache via that trace bus.

It will be appreciated that there are a number of ways in which the trace logic can be arranged to determine when it is appropriate to generate trace data and when such trace data is not required. In one embodiment, the control storage identifies one or more trace conditions that are required to be associated with the transaction if the one or more attributes associated with that transaction are to be stored as trace data, the trace logic comprising trigger logic operable to control generation of the trace data dependent on whether the one or more trace conditions exist. This enables the trace logic to selectively generate trace data dependent on whether the one or more trace conditions exists. This hence enables the amount of trace data generated to be controlled by appropriate definition of the trace conditions within the control storage.

As an alternative to the above approach, or in addition, the trigger logic within the trace logic may be arranged to be operable to control generation of the trace data dependent on a control signal indicating an occurrence of a predetermined event. By this approach, events external to the data processing apparatus can be used to trigger the generation of trace data.

It will be appreciated that the trace logic can be embodied in a variety of ways. However, in one embodiment, the trace logic comprises trace generation logic operable to generate the trace data and address generation logic operable to select the trace address to be associated with the trace data. Hence, the management of trace address generation can be handled separately to the generation of the trace data itself, and in one example the address generation logic can be arranged to merely increment through the available trace addresses within the trace address range as each corresponding unit of trace data (for example a cache line's worth of trace data) is generated.

As mentioned earlier, in one embodiment a dedicated trace bus can be provided for enabling the trace data to be retrieved from the cache memory. In addition, or as an alternative to the use of such a trace bus, the master device may be operable upon receipt of an interrupt signal to control output of the stored trace data from the cache to a memory via the bus used to interconnect the master and slave devices. In such an embodiment, a memory interface associated with the memory will usually be provided as one of the slave devices connected to that bus, and accordingly the master device can be arranged to initiate a transaction to cause the stored trace data to be output from the cache to the memory interface coupled to the bus, from where it can be routed to the memory. In an alternative embodiment, the same mechanism could be used to route the trace data to another appropriate input/output interface instead of the memory interface, from where the trace data can be accessed for analysis.

In one particular embodiment, the trace logic comprises monitor logic operable to monitor the amount of trace data stored in the cache memory and to issue said interrupt signal if the amount of trace data reaches a predetermined level. Hence, in this embodiment, the cache controller can keep track of the amount of trace data stored and cause trace data to be output when that trace data reaches a predetermined level, with the aim of ensuring that space is maintained within the cache for the storage of newly generated trace data.

In one simple implementation of such monitor logic, the monitor logic may comprise an address counter, with the interrupt signal being issued if the address counter reaches a preset value. This particular implementation can be effective, particularly in situations where the trace data is only read out of the cache via use of the interrupt signal.

In embodiments where a dedicated trace bus is also provided, providing another route for trace data to be output from the cache, the monitor logic may be arranged to monitor an amount of active trace data stored in the cache memory based on the amount of trace data stored in the cache memory and the amount of trace data retrieved from the cache via the trace bus.

In one particular embodiment, the monitor logic maintains a first pointer incremented each time trace data is stored in the cache memory, and a second pointer incremented each time trace data is retrieved from the cache memory via the trace bus, if the difference between the first and second pointers reaches a preset value, the monitor logic being operable to issue an interrupt signal, the master device being operable upon receipt of the interrupt signal to control output of the stored trace data from the cache via the bus. In such embodiments, trace data can be read out of the cache as and when required via the trace bus, but if the monitor logic determines that the amount of trace data is reaching a predetermined level, it can cause an interrupt signal to be issued to cause the master device to control output of the trace data.

It will be appreciated that the attributes associated with the transaction that are to be traced can take a variety of forms. In one embodiment, such attributes comprise one or more of the transaction address, the data value, and one or more control values of the transaction. In addition, or alternatively, the one or more attributes may comprise cache operation data associated with the transaction. Examples of such cache operation data may be data identifying whether, in response to the transaction, a cache hit or miss occurred, a cache line was evicted, etc.

In addition to generating trace data relating to transactions initiated by the master device, the cache may also be operable in certain situations to initiate a transaction, and in such embodiments the trace logic may be operable to selectively generate as trace data one or more attributes associated with that transaction for storage within the cache. An example of such a transaction that may be initiated by the cache is a transaction relating to an eviction of one or more data values from the cache.

It will be appreciated that the caching logic can take a variety of forms. However, considering the embodiment where the caching logic is operable to store the trace data within a reserved cache way, the caching logic may include write control logic operable to control writing to the cache memory, the write control logic having access to a storage identifying the at least one reserved cache way reserved for trace data, and the write control logic being operable to store the trace data within one of the at least one reserved cache ways.

In one embodiment, the caching logic includes write control logic operable to control writing to the cache memory, the write control logic incorporating arbitration logic operable to arbitrate between the data values to be cached in the cache memory and the trace data to be stored in the cache memory. As an example, the arbitration logic may be arranged to ensure that the caching of data values takes priority over the storing of trace data, in order to ensure that the performance of the normal caching activity of the cache is not impacted by the storing of trace data.

Viewed from a second aspect, the present invention provides a method of storing trace data within a data processing apparatus, the data processing apparatus having a bus operable to interconnect a number of master devices and slave devices to enable transactions to be routed between the master and slave devices, a master device operable to initiate a transaction, the transaction specifying a transaction address, and a cache interposed between the master device and the bus and operable to receive the transaction, the cache having a cache memory and a cache controller operable to control access to the cache memory, the method comprising arranging the cache to perform the steps of: (i) employing caching logic to selectively cache a data value of the transaction at a location in the cache memory chosen dependent on the transaction address; (ii) identifying within control storage a trace address range specifying a trace region; (iii) selectively generating as trace data one or more attributes associated with the transaction and providing in association with that trace data a trace address selected from the trace address range; and (iv) employing the caching logic to store the trace data at a location in the cache memory chosen dependent on the trace address.

DETAILED DESCRIPTION OF AN EXAMPLE EMBODIMENT

Figure 1:
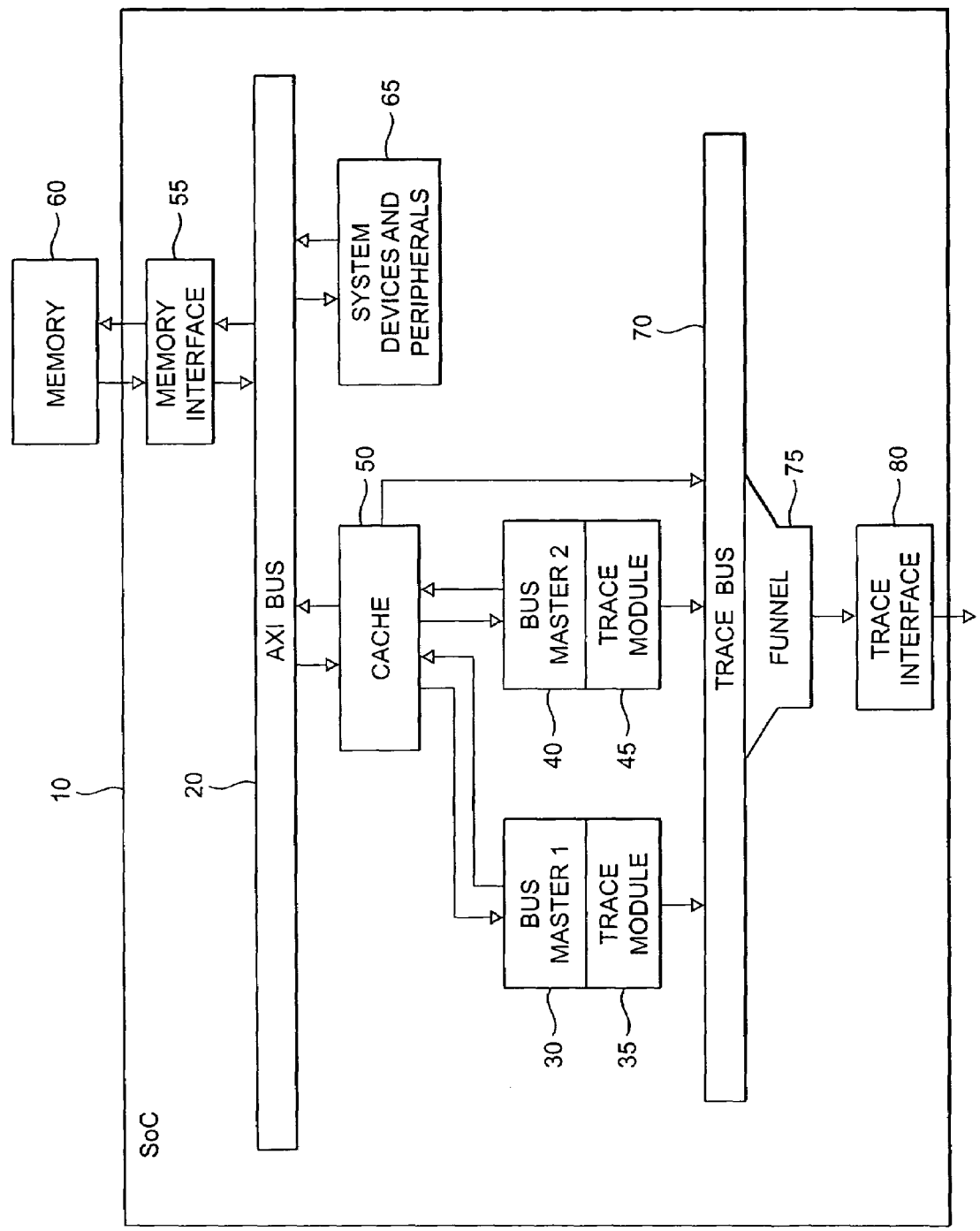
FIG. 1 is a block diagram of a data processing apparatus in accordance with one non-limiting example embodiment.

FIG. 1 is a block diagram illustrating a data processing apparatus 10 in accordance with one non-limiting example embodiment. In this example, the data processing apparatus is a SoC incorporating a bus 20 having a number of master devices and slave devices coupled thereto. A master device is a device that initiates a transaction, and a slave device is a device which responds to a transaction. The bus 20 can take a variety of forms, but in FIG. 1 is assumed to be a bus conforming to the Advanced Microcontroller Bus Architecture (AMBA) AXI (Advanced eXtensible Interface) specification developed by ARM Limited, Cambridge, England. As shown in FIG. 1, two bus master devices 30, 40 are coupled to the bus 20 via a cache 50, such a cache often being referred to as a level 2 cache (a level 1 cache often being incorporated within the individual bus masters).

As shown in FIG. 1, the SoC 10 is connected to an external memory 60 via a memory interface 55 coupled to the bus 20, the memory interface acting as a slave device for transactions initiated by bus master devices seeking access to the memory 60. In addition, a number of other system devices and peripherals 65 may be connected to the bus 20, some of those devices and peripherals being master devices and others of those devices and peripherals being slave devices.

When a bus master device wishes to access data stored in the memory 60, it will initiate a transaction specifying the address of that data. This will cause a transfer to take place from the bus master device to the memory interface 55. In the event of a write access, a write transfer from the bus master to the memory interface 55 will also occur specifying the data to be written to the specified address. In the event of a read access, data retrieved from the memory 60 via the memory interface 55 will be returned to the bus master via a transfer from the memory interface to the bus master over the bus 20.

If the master device is one of the two master devices 30, 40 then any such transaction initiated by either of those bus masters will cause a transfer to be output from the bus master to the cache 50. If the transaction is a cacheable transaction, then the cache will typically perform a cache lookup to see whether data pertaining to the memory address of the transaction is in fact already stored within the cache, commonly known as a cache hit. If so, then for a write access the data will typically be written into the cache (and may optionally at that time additionally be propagated from the cache via the bus 20 to the memory interface 55 to cause the data to be stored within the memory 60, this being referred to as "write through" behaviour). Alternatively, in the event of a read access the required data will be obtained from the cache and returned to the bus master without any need for the transfer to be output on to the bus 20. If the transaction is cacheable, but a cache miss occurs, or if the transaction is not cacheable, then the cache 50 will propagate the transfer out on to the bus 20 where it will be received by the memory interface 55 and processed as appropriate. Any data returned to the bus master as a result of such processing will be routed via the cache 50 to the relevant bus master, and may optionally at that time be stored within the cache, this being referred to as "read allocate" behaviour.

As shown in FIG. 1, each of the bus masters 30, 40 has a trace module 35, 45 integrated therewith, which is operable to trace desired activities of the master device. The trace data generated by these trace modules 35, 45 may be output on to a trace bus 70 provided within the SoC 10, with a trace funnel 75 then being arranged to create from these various sources of trace data a serial stream of trace data for outputting via a trace interface 80 to a trace buffer or the like. It will be appreciated that the trace buffer can be provided on-chip or off-chip, but in FIG. 1 it is assumed that the trace buffer is off-chip.

In accordance with the example embodiment illustrated in FIG. 1, the cache 50 is modified to enable the cache to internally generate and store trace data relating to transfers occurring between either bus master 30 or bus master 40 and the bus 20, with the cache then being coupled to the trace bus 70 to allow that trace data to be output to the trace buffer.

Figure 2:
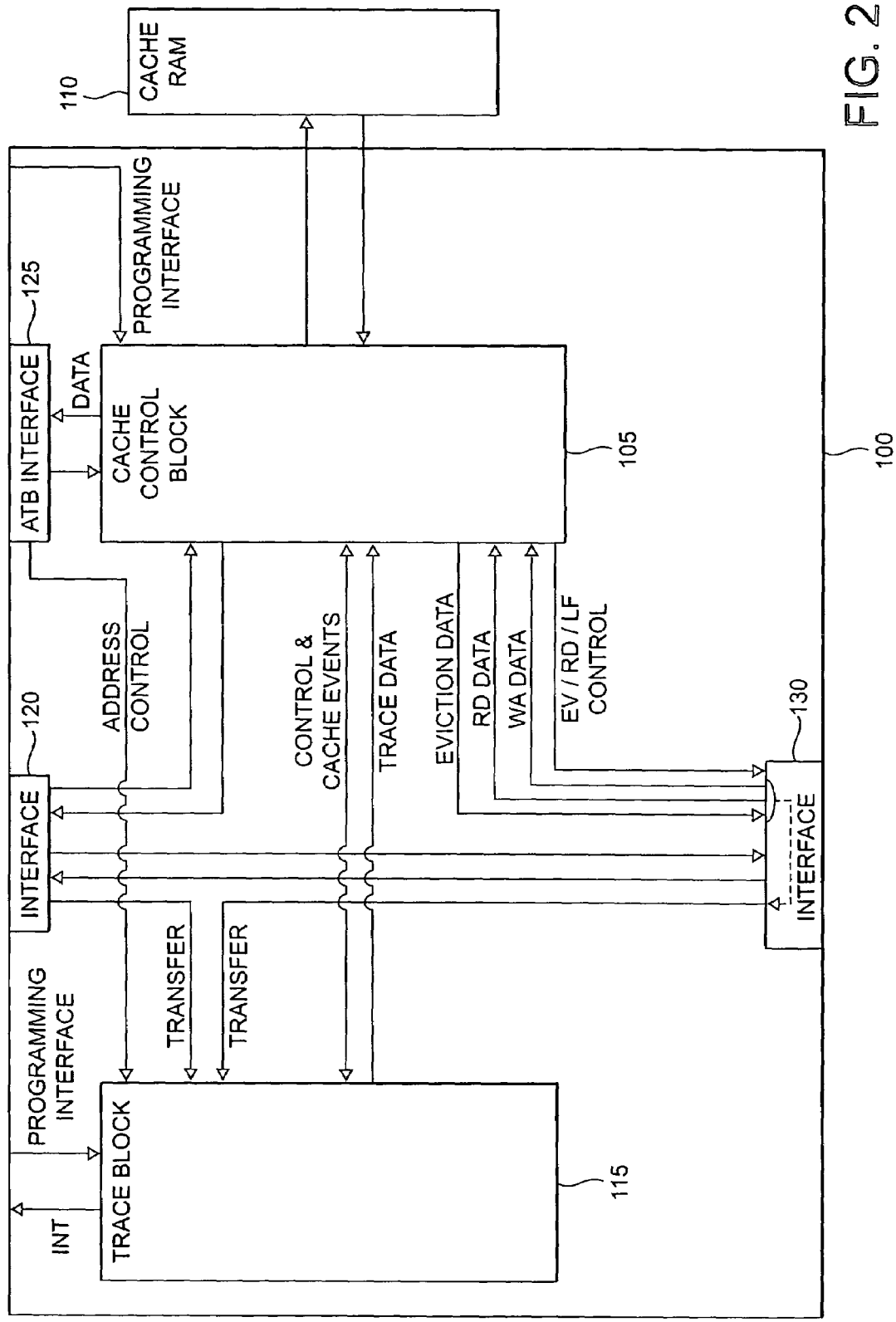
FIG. 2 is a block diagram illustrating in more detail the structure of the cache of FIG. 1.

FIG. 2 is a block diagram illustrating in more detail components provided within the cache 50 in order to facilitate such tracing activity. The cache 50 consists of a cache controller 100 and a cache memory 110, which in the embodiment illustrated in FIG. 2 is organised as a Random Access Memory (RAM). The cache controller 100 includes an interface 120 for coupling the cache to the bus masters 30, 40, an interface 130 for connecting the cache to the bus 20, and an interface 125 for connecting the cache to the trace bus 70. Direct connections are provided between the interface 120 and the interface 130 for the transfer of data in either direction between those interfaces relating to non-cacheable transactions. However, for cacheable transactions, a cache control block 105 is provided for controlling access to the cache memory 110. As will be appreciated by those skilled in the art, if a cacheable transaction is initiated by one of the master devices 30, 40, the cache control block 105 will perform a cache lookup in order to determine whether the address the subject of the transaction results in a cache hit or a cache miss. In the event of a cache hit, then write data can be routed from the interface 20 via the cache control block 105 to the cache memory 110 for storing within the cache, and read data can likewise be retrieved from the cache memory 110 via the cache control block 105 for returning via the interface 120 to the master device.

The cache memory 110 will be arranged as a series of cache lines, with each cache line storing a plurality of data words. Any writing to the cache will be done as a number of whole cache lines. Accordingly, if a cacheable write transaction provides data which is not sufficient to fill an entire cache line, then the cache control block 105 will issue a linefill request (LF) signal to the interface 130 to cause the remaining data required to fill the cache line to be retrieved from the memory 60 via the memory interface 55, with that data then being returned over a write allocate (WA) data path from the interface 130 to the cache control block 105. At this point the write of the required cache line in the cache memory 110 can then take place. Similarly, if a cache read operation takes place but a cache miss occurs, then the cache control block 105 will issue a read control signal via the interface 130 to cause the required data to be retrieved from the memory 60, this data being returned over a read data (RD) path to the cache control block 105, whereafter it will then optionally be written to the cache 110 (dependent on a read allocate bit). At the same time as, or before, the optional write takes place, this data can be routed to the interface 120 for outputting back to the master device.

As also shown in FIG. 2, a path exists from cache control block 105 to the interface 130 for the output of evicted data. As will be appreciated by those skilled in the art, the data in particular cache lines will need periodically to be evicted from the cache to free up space for other data, this evicted data being routed via the interface 130 to the memory interface 55 for storing in the memory 60. In association with this data the cache control block 105 will also issue eviction control signals to the interface 130 to control the eviction process.

The above described activities of the cache control block 105 are standard caching activities that would be expected to be present within a standard cache controller 100. However, in addition to those standard activities, the cache controller 100 is also arranged to allow trace data to be generated and stored within the cache memory 110. To facilitate this, a trace block 115 is provided which can be programmed by one of the bus masters 30, 40 via a programming interface. More particularly, as will be described in more detail later with reference to FIG. 4, a set of control registers within the trace block can be programmed to identify the conditions under which trace data should be generated, the type of information that should be traced, and to set a trace address range specifying a trace region. In one embodiment, this trace address range is specified to be a unique range of addresses outside of the range associated with the memory of the data processing apparatus.

Information about transfers passing from the master devices 30, 40 to the bus 20, or from the bus 20 to the master devices 30, 40 can be routed from the relevant interfaces 120, 130 to the trace block 115 for use in the generation of trace data as and when required. When trace data is generated, it is routed over a trace data path from trace block 115 to the cache control block 105 along with associated control information and a trace address generated by the trace block 115 for that trace data. The cache control block 105 is then arranged to cause that trace data to be stored within the cache memory 110 at a location chosen dependent on the trace address. Cache events occurring as a result of processing a particular transaction can also be routed from the cache control block 105 to the trace block 115 if it is desired to trace such events, with the trace block 115 then incorporating that event information within the trace data generated.

The trace block 115 can also be arranged to monitor the amount of trace data stored within the cache memory 110, and when that amount of trace data reaches a predetermined level, can be arranged to generate an interrupt signal for outputting to one of the bus master devices 30, 40. Upon receipt of that interrupt, the master device will execute an interrupt routine in order to cause at least some of the cached trace data to be output from the cache memory 110 for storage within the memory 60. It will be appreciated that this could be done by first retrieving the data into registers of the bus master 30, 40, and then initiating a separate non-cacheable transfer to output that data from the bus master to the memory 60 via the bus 20, or alternatively the interrupt routine may cause the data to be output directly from the cache memory 110 via the interface 130 to the bus 20 for storage within the memory 60.

The cache control block 105 is programmable via a programming interface. Although in FIG. 2 this is shown separately to the programming interface for the trace block 115, both programming interfaces may be provided by a single common interface. Via the programming interface, registers can be programmed to provide functionality to, for example, enable/disable the cache, perform test and debug, perform cache maintenance, and perform cache configuration. Using this feature, a master device can also initiate an operation by programming these registers to initiate a process to clean and invalidate trace data. The process is operable to invalidate a cache line containing trace data and evict the trace data therein to memory 60.

The cache controller 100 also includes a trace bus interface 125 via which an external analysis tool can cause trace data to be retrieved from the cache memory 110. Accordingly, control signals can be input from the trace bus interface 125 to the cache control block 105, with the required trace data then being retrieved from the cache memory 110 and output from the cache control block 105 to the interface 125 for output to the trace bus 70, and from there to the analysis tool.

In preferred embodiments, details of the addresses of trace data retrieved in this manner are forwarded from the trace bus interface 125 to the trace block 115, to assist in the trace block 115 keeping track of the amount of active trace data (i.e. trace data which has not yet been retrieved from the cache memory 110) currently stored in the cache memory 110.

Figure 3:
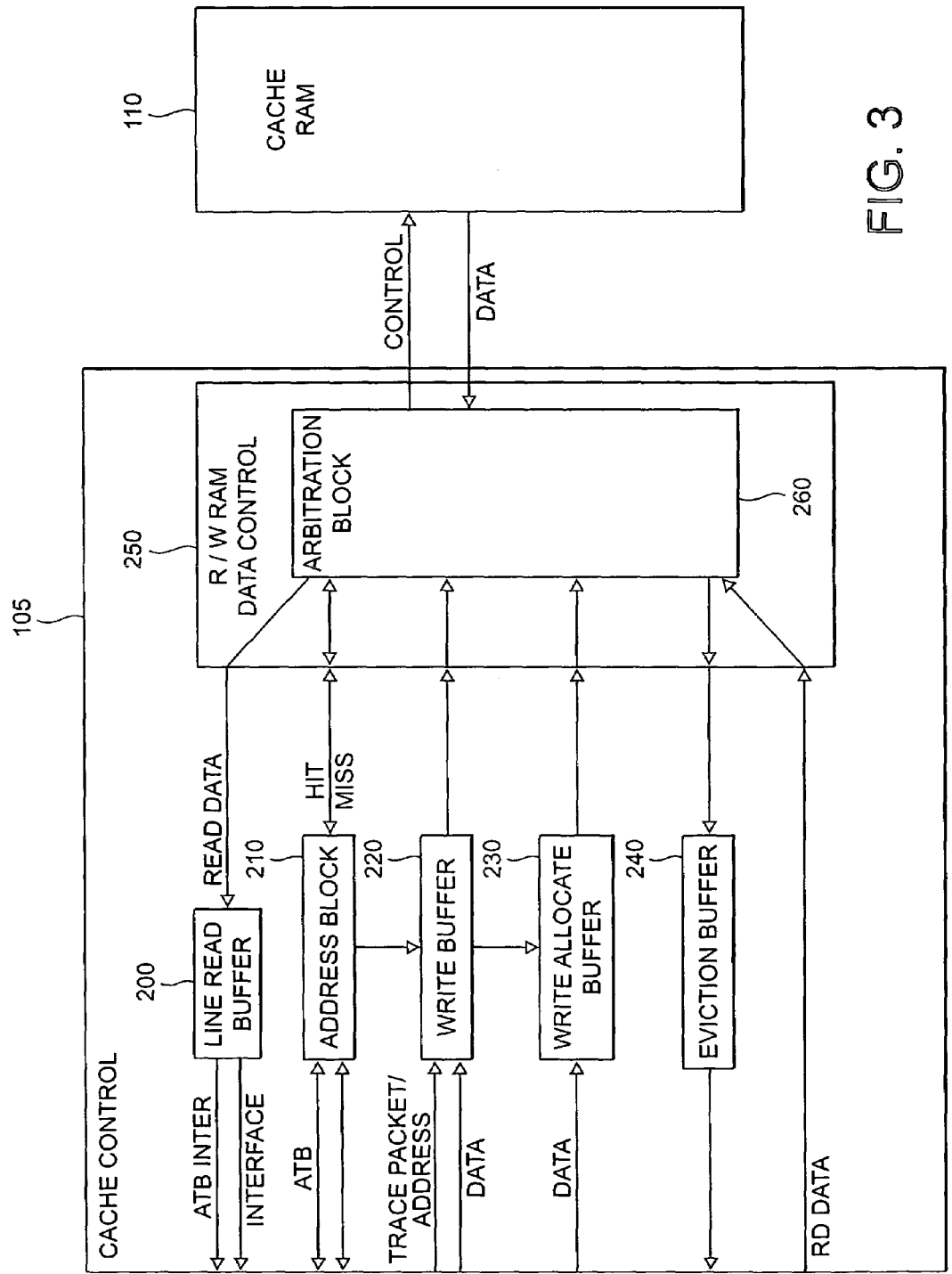
FIG. 3 is a block diagram illustrating in more detail the logic provided within the cache control block of FIG. 2 in accordance with one non-limiting example embodiment.

FIG. 3 is a block diagram illustrating in more detail some of the components provided within the cache control block 105. The cache control block 105 includes a read/write data control block 250 within which arbitration logic 260 is provided for arbitrating between the various requests to access the cache memory 110. An address block 210 is used to receive the transaction addresses routed from the bus masters 30, 40 via the interface 120 for any cacheable transactions, this address block 210 also receiving any addresses received at the trace bus interface 125 relating to trace data to be read from the cache. The address logic will then access the cache memory 110 via the arbitration block 260 in order to determine whether a cache hit or miss has occurred. The operations performed in dependence on whether a cache hit or a cache miss has occurred have already been discussed earlier with reference to FIG. 2. In the event of a cacheable read access for which a cache hit is determined, the required data can be retrieved from the cache memory 110 by the data control logic 250 and routed via the line read buffer 200 for output to the interface 120 for onwards transmission to the bus master 30, 40 that initiated the read access. Similarly, if a request for trace data is made via the trace bus interface 125, the required trace data can be output via the line read buffer 200 to the trace bus interface 125 for output over the trace bus 70.

A write buffer 220 is also provided within the cache control block 105 which can receive control signals from the address block 210. In particular, for a write access initiated by one of the bus masters 30, 40, the associated write data can be routed from the interface 120 into the write buffer 220. If when the address block 210 performs a cache lookup for the associated address, a cache hit is detected, the address block 210 can send a control signal to the write buffer 220 to cause the write data to be output via the arbitration block 260 to the cache memory 110 for writing within the cache. If a entire cache line of write data is stored in the write buffer 220 in association with that address, then it can output directly from the write buffer to the cache memory 110. However, in the event that less than an entire cache line of write data is present in the write buffer 220, then the write buffer 220 will send a control signal on to the write allocate buffer 230, and, as described previously with reference to FIG. 2, write access control signals will be output from the cache control block 105 to the interface 130 to cause the required data needed to complete a cache line to be retrieved from the memory 60. When this data is retrieved from the memory into the write allocate buffer 230, then an entire cache line of data can be output from the write allocate buffer 230 to the arbitration block 260 for storing within the cache memory 110.

In addition, as illustrated in FIG. 3, when the trace block 115 creates a packet of trace data and an associated trace address, that information is routed to the write buffer 220. The packet of trace data (including address and control information) is stored within the write buffer, and in addition the write buffer is arranged to mark that data such that the read/write control block 250 can detect that that data is trace data rather than normal cache data, and can deal with that trace data appropriately.

In particular, when the data control block 250 receives a packet of trace data from the write buffer 220, it will store that trace data in the cache memory 110 at a location dependent on the trace address. In one particular embodiment, the cache memory 110 has a plurality of cache ways, and at least one of ways is reserved for trace data. In this embodiment the data control block 250 is arranged to send appropriate control signals to the cache memory 110 to cause the packet of trace data to be stored within a reserved cache way at a location dependent on the trace address. In an alternative embodiment, there may not be a specific cache way reserved for trace data, and instead the trace data can be stored in any of the cache ways at a location dependent on the trace address. In this embodiment, the cache controller will be adapted to maintain a record of which locations in the cache memory contain trace data. As one example, this can be done by providing a control field in association with each cache line, which is used as a trace field, with the cache controller setting the trace field if the associated cache line contains trace data.

As also shown in FIG. 3, an eviction buffer 240 is provided within the cache control block 105 for storing data that is being evicted from the cache memory 110. This eviction process was described earlier with reference to FIG. 2. In addition, a read data path is provided within the cache control block 105 for routing data read from memory via the interface 130 to the arbitration block 260, for storage within the cache memory 110. As discussed earlier, such read data will be obtained in the event of a cacheable read transaction initiated by one of the master devices 30, 40, where a cache miss occurs on a Read Allocate transaction. The read data may be buffered within the interface 130 as appropriate prior to passing to the cache control block 105.

Figure 4:
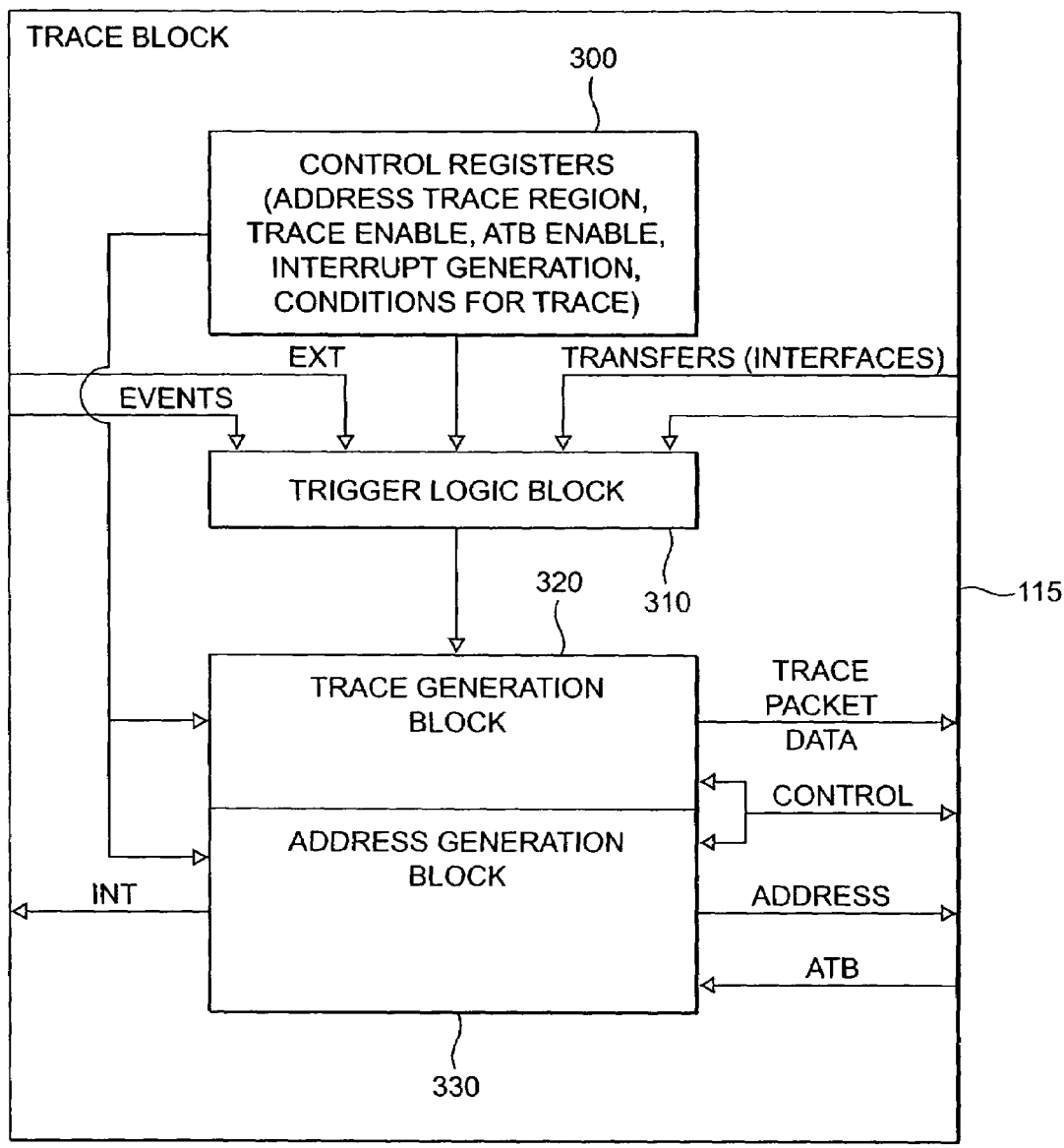
FIG. 4 is a block diagram illustrating the logic provided within the trace block of FIG. 2 in accordance with one non-limiting example embodiment.

FIG. 4 is a block diagram illustrating in more detail logic provided within the trace block 115 of FIG. 2. A set of control registers 300 are provided for defining certain control information pertinent to the operation of the logic within the trace block 115. In particular, an address trace region will be defined within the control registers, identifying a range of trace addresses that can be used in association with trace data generated by the trace block 115. As mentioned earlier, this address trace region may in one embodiment be selected to be a unique range of addresses. Other information contained within the control registers will relate to the conditions that need to be met in order for the trace functionality to be activated, this allowing tracing to be selectively turned on and off dependent on whether those conditions are met. Further, a trace enable flag will be provided within the control registers 300 which can be set to enable the tracing function. Similarly, a trace bus enable flag will be provided which will be set to indicate that the trace bus connection between the cache 50 and the trace bus 70 is activated. Further information in the control registers 300 will be used to indicate when an interrupt should be generated by the trace block 115, as mentioned earlier this function being provided such that the trace block 115 can issue an interrupt to one of the bus masters 30, 40 when the amount of trace data in the cache memory 110 reaches a predetermined level.

The trigger logic block 310 is arranged to receive details of the transfers received at either interface 120 or interface 130, and to determine from this information whether the conditions for tracing have been met. If so, the trigger logic 310 will send a control signal to the trace generation block 320 and the address generation block 330 to cause tracing to be activated. The trigger logic block can also be arranged to send such a control signal if one or more external events are received at the trigger logic block 310, for example an external event indicating a match of a specific address.

The trace generation block 320 is arranged to generate packets of trace data incorporating attributes of the received transfers that are desired to be traced. It will be appreciated that these attributes may take a variety of forms. For example, they may include one or more of the transaction address, the associated data value being written or read, and one or more control values of the transaction. In addition, or alternatively, cache event information routed from the cache control block 105 to the trace block 115 can be incorporated within the packet of trace data to provide information about the operation of the cache when handling the transaction. Examples of such cache operation data could be data identifying whether, in response to the transaction, a cache hit or miss occurred, a cache line was evicted, etc.

In association with the packet of trace data produced by the trace generation block 320, the address generation block 330 will also produce an associated trace address, this trace address being chosen from the range of addresses specified by the address trace region in the control registers 300. In situations where the trace bus interface 125 is deactivated, and accordingly any trace data stored in the cache memory 110 can only be retrieved from the cache memory by the address generation block 330 generating an interrupt to one of the master devices 30, 40, then the address may be generated merely by incrementing through the available addresses within the address trace region, with the address generation block 330 including the necessary incrementing logic to generate the required addresses.

However, as shown in FIG. 4, an input path is provided from the trace bus interface 125, over which details of any trace addresses for trace data accessed via the trace bus interface 125 is provided in the event that the trace bus interface 125 is enabled. The address generation block 330 will be arranged to maintain a first pointer which is incremented each time a packet of trace data is generated by the trace generation block 320 (and hence a trace address is generated by the address generation block 330), and will also include a second pointer which is incremented each time signals received from the trace bus interface 125 indicate that trace data has been received from the cache memory via the trace bus 70. This will enable the address generation block 330 to keep track of the active trace data within the cache memory 110, i.e. the trace data that has not yet been read out of the cache memory.

If the difference between the first and second pointers reaches a preset value, indicating that the amount of active trace data within the cache memory 110 has reached a predetermined level, then the address generation block 330 can be arranged to generate an interrupt signal for routing to one of the bus masters 30, 40, as discussed previously this resulting in at least some of the active trace data in the cache memory 110 being read from the cache memory 110 for output to the memory 60.

In accordance with normal cache operation principles, when trace data has been read from the cache memory 110 to the memory 60, it can be marked as invalid so that new trace data can be written over the top of it. In a similar manner, entries containing trace data will also typically be marked as invalid once that trace data has been output via the trace bus 70.

Figure 5:
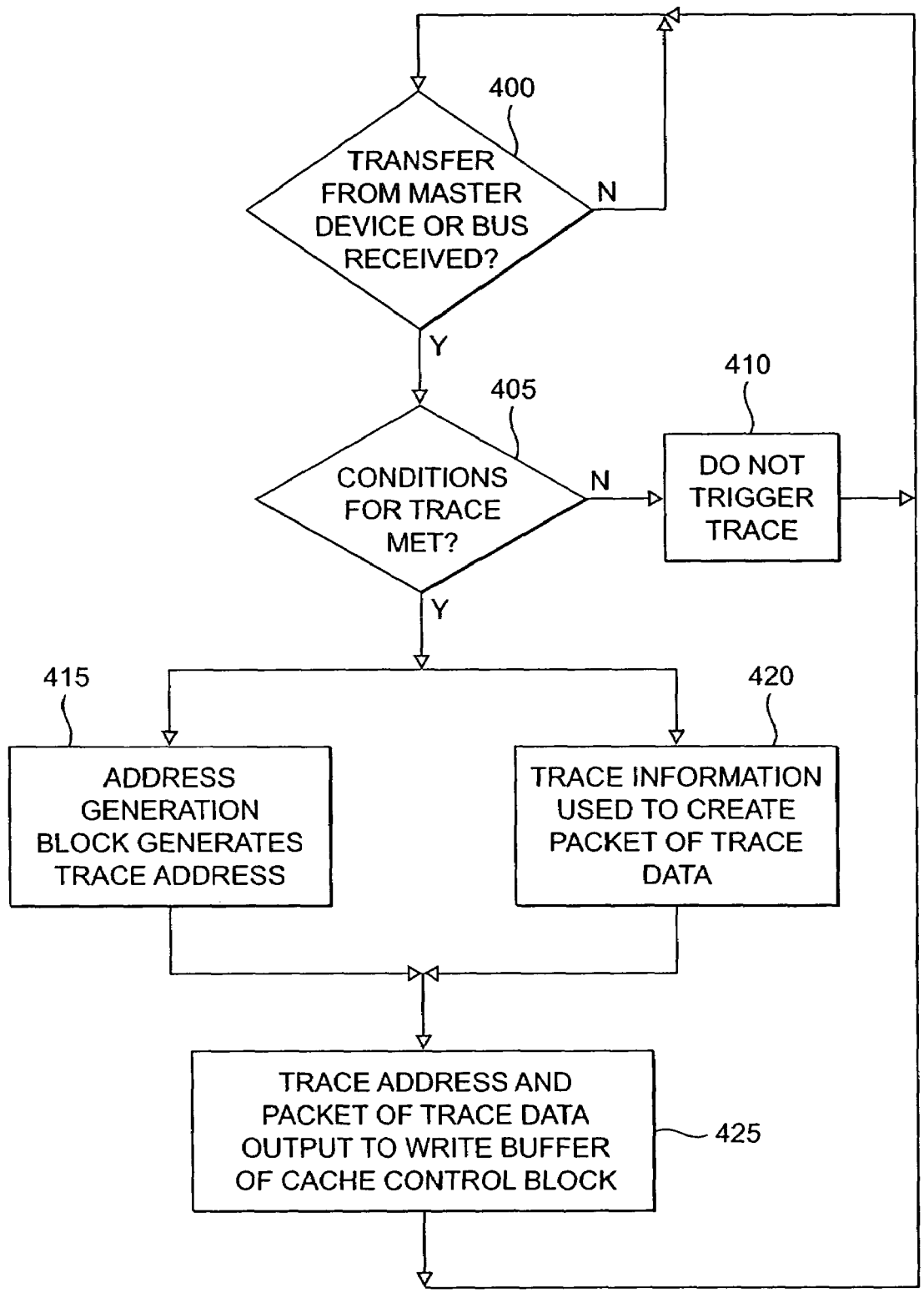
FIG. 5 is a flow diagram illustrating the operation of the trace block of FIG. 4.

FIG. 5 is a flow diagram illustrating the operation of logic within the trace block 115 of FIG. 4. At step 400, it is determined whether a transfer from a master device 30, 40 or from the bus 20 has been received by the trigger logic block 310. When at step 400 it is determined that such a transfer has been received, then the process proceeds to step 405, where it is determined whether the conditions for tracing have been met. If not, then the process proceeds to step 410, where the trigger logic 310 does not send a control signal to the trace generation block to cause trace data to be generated. The process then returns to step 400.

However, if at step 405 it is determined that the conditions for trace have been met, then the process proceeds in parallel to steps 415 and 420. At step 415, the address generation block 330 generates a trace address, whilst at step 420 the trace generation block 320 creates a packet of trace data from the relevant information associated with the transfer. Thereafter, at step 425, the trace address and the packet of trace data are output to the write buffer 220 of the cache control block 105. At this point, processing within the trace block 115 returns to step 400.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   a bus configured to interconnect a number of master devices and slave devices to enable transactions to be routed between the master and slave devices;
   a master device configured to initiate a transaction, the transaction specifying a transaction address, the transaction address being an address in memory associated with a data value of the transaction;
   a cache interposed between the master device and the bus and configured to receive the transaction, the cache having a cache memory and a cache controller configured to control access to the cache memory, the cache controller comprising caching logic configured to selectively cache the data value of the transaction at a location in the cache memory chosen dependent on the transaction address so that the data value is subsequently accessible by the master device from the cache;
   control storage configured to identify a trace address range specifying a trace region; and
   trace logic configured to selectively generate as trace data one or more attributes associated with the transaction and to provide in association with that trace data a trace address selected from the trace address range;
   the caching logic being configured to store the trace data at a location in the cache memory chosen dependent on the trace address for subsequent reference by an analysis tool used to analyze activities of the data processing apparatus.

2. A data processing apparatus as claimed in claim 1, wherein the cache memory comprises a plurality of cache ways including at least one reserved cache way reserved for trace data, and the caching logic is configured to store the trace data within one of the at least one reserved cache ways.

3. A data processing apparatus as claimed in claim 1, wherein the cache controller is configured to maintain a record of which locations in the cache memory contain trace data and the order in which the trace data was received by the cache.

4. A data processing apparatus as claimed in claim 3, wherein the cache memory comprises a plurality of cache lines, each cache line having one or more control fields associated therewith, one control field being a trace field, the cache controller being configured to set the trace field if the associated cache line contains trace data.

5. A data processing apparatus as claimed in claim 1, wherein the cache has a trace bus connected thereto, the trace data being retrievable from the cache memory via the trace bus.

6. A data processing apparatus as claimed in claim 1, wherein the control storage identifies one or more trace conditions that are required to be associated with the transaction if the one or more attributes associated with that transaction are to be stored as trace data, the trace logic comprising trigger logic configured to control generation of the trace data dependent on whether the one or more trace conditions exist.

7. A data processing apparatus as claimed in claim 1, wherein the trace logic comprises trigger logic configured to control generation of the trace data dependent on a control signal indicating an occurrence of a predetermined event.

8. A data processing apparatus as claimed in claim 1, wherein the trace logic comprises trace generation logic configured to generate the trace data and address generation logic configured to select the trace address to be associated with the trace data.

9. A data processing apparatus as claimed in claim 1, wherein the master device is configured upon receipt of an interrupt signal to control output of the stored trace data from the cache to a memory via the bus.

10. A data processing apparatus as claimed in claim 9, wherein the trace logic comprises monitor logic configured to monitor the amount of trace data stored in the cache memory and to issue said interrupt signal if the amount of trace data reaches a predetermined level.

11. A data processing apparatus as claimed in claim 10, wherein the monitor logic comprises an address counter, the interrupt signal being issued if the address counter reaches a preset value.

12. A data processing apparatus as claimed in claim 5, wherein the trace logic comprises monitor logic configured to monitor an amount of active trace data stored in the cache memory based on the amount of trace data stored in the cache memory and the amount of trace data retrieved from the cache via the trace bus.

13. A data processing apparatus as claimed in claim 12, wherein the monitor logic maintains a first pointer incremented each time trace data is stored in the cache memory, and a second pointer incremented each time trace data is retrieved from the cache memory via the trace bus, if the difference between the first and second pointers reaches a preset value, the monitor logic being configured to issue an interrupt signal, the master device being configured upon receipt of the interrupt signal to control output of the stored trace data from the cache via the bus.

14. A data processing apparatus as claimed in claim 1, wherein the one or more attributes associated with the transaction that are generated as trace data comprises one or more of the transaction address, the data value, and one or more control values of the transaction.

15. A data processing apparatus as claimed in claim 1, wherein the one or more attributes associated with the transaction that are generated as trace data comprises cache operation data associated with the transaction.

16. A data processing apparatus as claimed in claim 1, wherein the cache is configured to initiate a transaction and the trace logic is configured to selectively generate as trace data one or more attributes associated with that transaction for storage within the cache.

17. A data processing apparatus as claimed in claim 16, wherein the transaction relates to an eviction of one or more data values from the cache.

18. A data processing apparatus as claimed in claim 2 wherein the caching logic includes write control logic configured to control writing to the cache memory, the write control logic having access to a storage identifying the at least one reserved cache way reserved for trace data, and the write control logic being configured to store the trace data within one of the at least one reserved cache ways.

19. A data processing apparatus as claimed in claim 1, wherein the caching logic includes write control logic configured to control writing to the cache memory, the write control logic incorporating arbitration logic configured to arbitrate between said data values to be cached in the cache memory and said trace data to be stored in the cache memory.

20. A method of storing trace data within a data processing apparatus, the data processing apparatus having a bus configured to interconnect a number of master devices and slave devices to enable transactions to be routed between the master and slave devices, a master device configured to initiate a transaction, the transaction specifying a transaction address, the transaction address being an address in memory associated with a data value of the transaction, and a cache interposed between the master device and the bus and configured to receive the transaction, the cache having a cache memory and a cache controller configured to control access to the cache memory, the method comprising arranging the cache to perform the steps of:
  (i) employing caching logic to selectively cache the data value of the transaction at a location in the cache memory chosen dependent on the transaction address so that the data value is subsequently accessible by the master device from the cache;
  (ii) identifying within control storage a trace address range specifying a trace region;
  (iii) selectively generating as trace data one or more attributes associated with the transaction and providing in association with that trace data a trace address selected from the trace address range; and
  (iv) employing the caching logic to store the trace data at a location in the cache memory chosen dependent on the trace address for subsequent reference by an analysis tool used to analyze activities of the data processing apparatus.

21. A method as claimed in claim 20, wherein the cache memory comprises a plurality of cache ways including at least one reserved cache way reserved for trace data, and at said step (iv) the caching logic stores the trace data within one of the at least one reserved cache ways.

22. A method as claimed in claim 20, further comprising the step of maintaining a record of which locations in the cache memory contain trace data and the order in which the trace data was received by the cache.

23. A method as claimed in claim 22, wherein the cache memory comprises a plurality of cache lines, each cache line having one or more control fields associated therewith, one control field being a trace field, and the cache controller setting the trace field if the associated cache line contains trace data.

24. A method as claimed in claim 20, wherein the cache has a trace bus connected thereto, the method further comprising the step of retrieving the trace data from the cache memory via the trace bus.

25. A method as claimed in claim 20, wherein the control storage identifies one or more trace conditions that are required to be associated with the transaction if the one or more attributes associated with that transaction are to be stored as trace data, during said step (iii) the generation of the trace data being controlled dependent on whether the one or more trace conditions exist.

26. A method as claimed in claim 20, wherein during said step (iii) the generation of the trace data is controlled dependent on a control signal indicating an occurrence of a predetermined event.

27. A method as claimed in claim 20, wherein the master device, upon receipt of an interrupt signal, controls output of the stored trace data from the cache to a memory via the bus.

28. A method as claimed in claim 27, further comprising the steps of:
monitoring the amount of trace data stored in the cache memory; and
issuing said interrupt signal if the amount of trace data reaches a predetermined level.

29. A method as claimed in claim 28, wherein said monitoring step comprises maintaining an address counter, the interrupt signal being issued if the address counter reaches a preset value.

30. A method as claimed in claim 24, further comprising the step of monitoring an amount of active trace data stored in the cache memory based on the amount of trace data stored in the cache memory and the amount of trace data retrieved from the cache via the trace bus.

31. A method as claimed in claim 30, wherein said monitoring step comprises incrementing a first pointer each time trace data is stored in the cache memory, and incrementing a second pointer each time trace data is retrieved from the cache memory via the trace bus, if the difference between the first and second pointers reaches a preset value, the method further comprising the step of issuing an interrupt signal, the master device, upon receipt of the interrupt signal, controls output of the stored trace data from the cache via the bus.

32. A method as claimed in claim 20, wherein the one or more attributes associated with the transaction that are generated as trace data comprises one or more of the transaction address, the data value, and one or more control values of the transaction.

33. A method as claimed in claim 20, wherein the one or more attributes associated with the transaction that are generated as trace data comprises cache operation data associated with the transaction.

34. A method as claimed in claim 20, wherein the cache initiates a transaction and said step (iii) comprises selectively generating as trace data one or more attributes associated with that transaction for storage within the cache.

35. A method as claimed in claim 34, wherein the transaction relates to an eviction of one or more data values from the cache.

36. A method as claimed in claim 21, wherein the caching logic includes write control logic that controls writing to the cache memory, the write control logic having access to a storage identifying the at least one reserved cache way reserved for trace data, and the write control logic storing the trace data within one of the at least one reserved cache ways.

37. A method as claimed in claim 20, wherein the caching logic includes write control logic that controls writing to the cache memory, the write control logic incorporating arbitration logic which arbitrates between said data values to be cached in the cache memory and said trace data to be stored in the cache memory.

* * * * *